US005705980A

United States Patent [19]

Shapiro

[11] Patent Number: 5,705,980

[45] Date of Patent: Jan. 6, 1998

[54] METHOD AND APPARATUS FOR SUMMONING POLICE OR SECURITY PERSONNEL FOR ASSISTANCE IN AN EMERGENCY SITUATION

[75] Inventor: Steven Curtis Shapiro, Lake Worth, Fla.

[73] Assignee: Motorola, Inc., Schaumburg, Ill.

[21] Appl. No.: 804,418

[22] Filed: Feb. 20, 1997

Related U.S. Application Data

[63] Continuation of Ser. No. 558,074, Nov. 13, 1995, abandoned.

[51] Int. Cl.[6] .......... G08B 1/08; H04B 7/15

[52] U.S. Cl. .......... 340/539; 340/311.1; 340/825.45; 340/825.47; 340/825.49; 455/11.1; 455/33.1; 455/54.2; 455/89; 379/37; 379/59

[58] Field of Search .......... 340/539, 311.1, 340/825.44–825.49, 825.69, 825.72; 455/9, 11.1, 33.1, 38.2, 54.1, 54.2, 67.1, 67.7, 89; 379/37, 38, 49, 59

[56] References Cited

U.S. PATENT DOCUMENTS

| | | | |
|---|---|---|---|
| 4,399,555 | 8/1983 | MacDonald et al. | 455/33.1 |
| 4,611,198 | 9/1986 | Levinson et al. | 340/539 |
| 4,940,963 | 7/1990 | Gutman et al. | 340/825.44 |
| 5,115,224 | 5/1992 | Kostusiak et al. | 340/539 |
| 5,218,344 | 6/1993 | Ricketts | 340/539 |
| 5,225,809 | 7/1993 | Bunn | 340/825.49 |
| 5,254,986 | 10/1993 | De Luca | 340/825.44 |
| 5,365,217 | 11/1994 | Toner | 340/539 |
| 5,396,227 | 3/1995 | Carroll et al. | 340/825.31 |
| 5,416,468 | 5/1995 | Baumann | 340/576 |
| 5,423,061 | 6/1995 | Fumarolo et al. | 455/54.1 |
| 5,493,286 | 2/1996 | Grube et al. | 340/825.44 |
| 5,539,395 | 7/1996 | Buss et al. | 340/827 |

OTHER PUBLICATIONS

D.J. Torrieri, "Statistical Theory of Passive Location Systems", IEEE Transactions on Aerospace and Electronic Systems, Mar. 1984, at 183, et seq.

"Beepers keep students secure", The Palm Beach Post, Dec. 27, 1994.

*Primary Examiner*—Donnie L. Crosland

[57] ABSTRACT

Security officers (38) can be summoned to help a person (28) in distress, by providing portable pagers (40) to a group of officers assigned to a protected area (26). A person entering the area carries an alarm unit (30) which, when actuated, transmits an emergency signal. When the emergency signal is received at a station (12, 32), the person's location is determined. All the security officers are then located by transmitting a location inquiry signal, and determining the officers' locations using location signals emitted from their pagers (40) in response to the inquiry signal. An officer nearest the person is identified, and an assistance order signal conveys the person's location to the officer's pager. If the officer does not manually activate his/her pager to confirm receipt of the person's location, by transmitting an acknowledgment signal during an interval following the order signal, the latter is re-transmitted to other officers near the person until an acknowledgment signal is detected.

27 Claims, 5 Drawing Sheets

METHOD AND APPARATUS FOR SUMMONING POLICE OR SECURITY PERSONNEL FOR ASSISTANCE IN AN EMERGENCY SITUATION

This is a continuation of application Ser. No. 08/558,074 filed Nov. 13, 1995, now abandoned.

FIELD OF THE INVENTION

The present invention relates generally to personal security systems, and particularly to a system and technique in which police or security personnel are paged by radio after a person in need of assistance transmits an emergency signal.

BACKGROUND OF THE INVENTION

Personal security is a major concern for everyone. Various security systems have been disclosed for use by students at college campuses, and for use by hospital employees and prison guards. For example, a security system was recently reported to have been installed at a University, wherein students and staff members each carry a small transmitter that allows them to summon help while on campus. When the transmitter is actuated, a distress signal is emitted and the signal is received at a number of receiving sites. The location of the sender is determined, and a computer photo of the sender may be retrieved. A dispatcher then advises the campus police of the sender's location and identity.

Current personal security systems, in which a person transmits a signal from a portable transmitter when in distress, require 24-hour monitoring by a security station dispatcher. See U.S. Pat. Nos. 5,365,217 (Nov. 15, 1994) and 4,611,198 (Sep. 9, 1986). Generally, when a person transmits a distress signal, an alarm showing the person's location is signaled at a security station display. Next, the station dispatcher must determine the whereabouts of a police or security officer who is closest to the distress site. After an officer closest to the distress site is identified, the officer is contacted via two-way radio and details of the incident are conveyed.

Thus, 24-hour per day dispatcher monitoring is essential for the current systems to function responsively. If a distress signal from a person needing help reaches a security station, but the station dispatcher is absent, the person in distress is left unassisted. Also, the requirement for full-time dispatcher coverage at the security station adds to overall system cost.

The present invention will now be described with reference to the following description taken in conjunction with the accompanying drawing figures, and the scope of the invention will be pointed out in the appended claims.

DESCRIPTION OF THE PREFERRED EMBODIMENT

The present invention relates to a personal security system in which police or security personnel can be summoned to help a person in a distress condition, using a pager-type (i.e., selective call transceiver) environment. The system does not require continuous 24-hour security station monitoring by a dispatcher.

Figure 1:
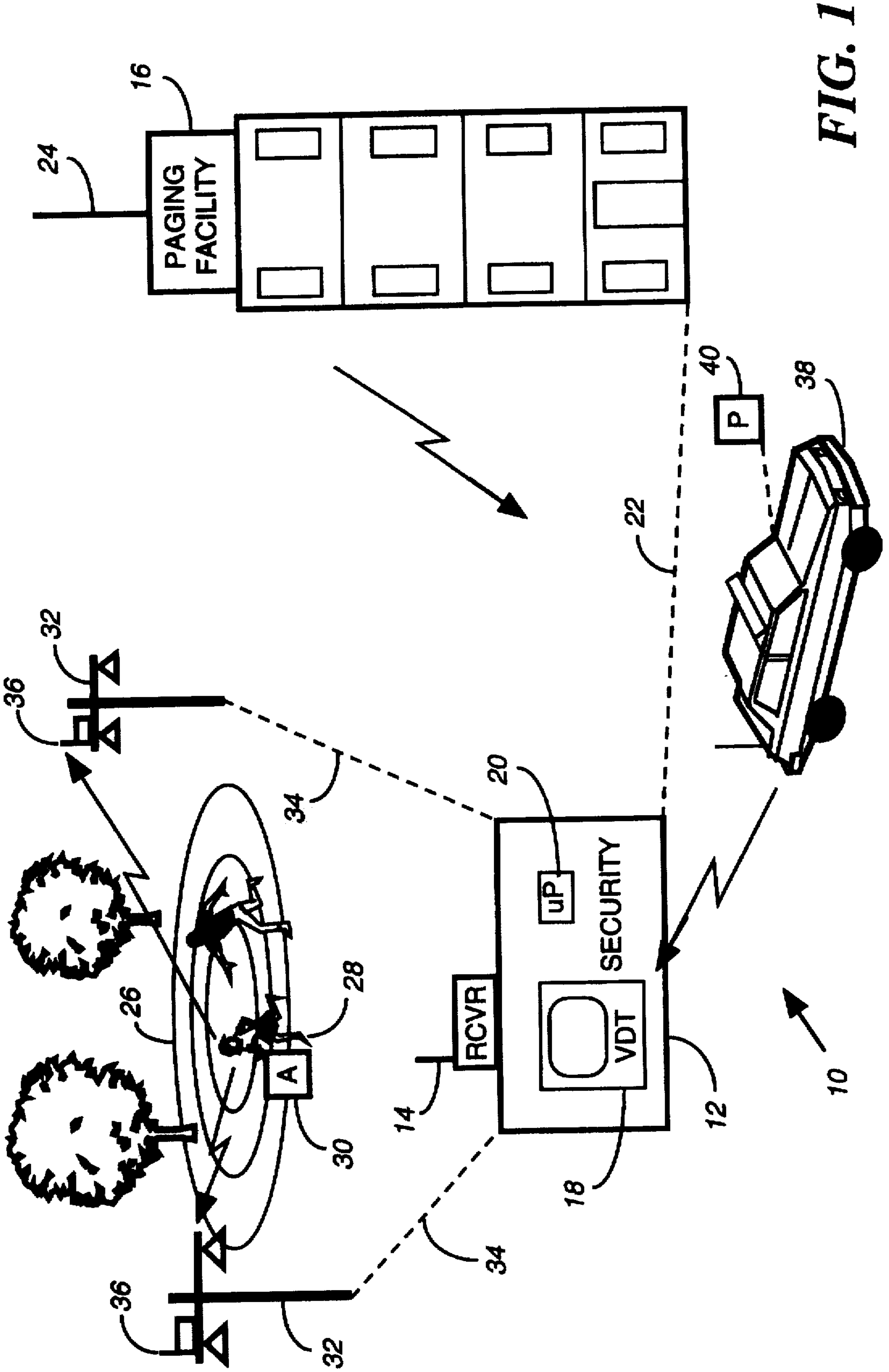
FIG. 1 is a pictorial representation of a personal security system according to the invention.

FIG. 1 is a pictorial representation of a personal security system 10 according to the invention. The system 10 includes a security station 12 with an antenna 14 and an associated paging facility 16. The security station 12 can also include a video display terminal (VDT) 18 and an input device such as a keyboard. In contrast to the prior systems, a security station VDT is not essential in the present system 10, however. Security station 12 also includes a processor 20. The processor 20 can, for example, comprise a conventional microprocessor with one or more read-only-memories (ROMs) for storing an operating program and information essential for paging and locating operations by the security station 12 and paging facility 16; one or more random-access-memories (RAMs) enabling the processor 20 to acquire and process data bearing on security station operations, and appropriate interface circuitry to couple the processor 20 with input and output (I/O) signal lines. Security station 12 is linked with the paging facility 16 by a land wire line 22. The paging facility 16 has an associated paging antenna 24.

The security station 12 together with the paging facility 16 operate to provide surveillance over a predetermined geographic area 26. For example, area 26 could be a college campus, the grounds of a public facility such as a park, or any defined area within a city, town, village, or the like. Upon encountering an unforeseen event such as a distressed or emergency condition in the area 26, a person 28 can summon the presence of mobile members of a group such as police or security officers for help. The person 28 carries a portable alarm unit (i.e. portable transmitter) 30 which, when actuated by the person, transmits an emergency signal from the unit 30. A number of relay stations 32 comprising at least one base receiver with associated antennas 36 are arrayed about the geographic area 26. The relay stations 32 and the security station 12 are located in the area 26 so that a signal transmitted from the alarm unit 30 will be received by at least one relay station or by the security station 12 regardless of the location of the unit 30 within the area 26. Those relay stations 32 at which an emergency signal is received, send a corresponding signal to the security station 12 through land wire lines 34.

Mobile police or security officers 38 assigned to, and prepositioned within, the protected area 26 are located at places (including specific positions and non-specific patrol areas) where they can be summoned to respond to a person requiring assistance anywhere within the area 26. Officers are equipped with portable pager units 40 (i.e., portable pager transceivers), each of which has a manual acknowledgment function. The pager units 40 preferably are similar to units disclosed in U.S. Pat. No. 4,940,963 (Jul. 10, 1990), the essential difference being that the acknowledgment transmitter of each pager unit 40 is similar to the modulator/transmitter 50 of the portable alarm unit 30 described herein below. All relevant portions of the '963 patent are incorporated by reference herein. Each pager unit 40 can be assigned to an individual police or security officer, or to an officer team that patrols the area 26, for example, in a police vehicle as depicted in FIG. 1.

Figure 2:
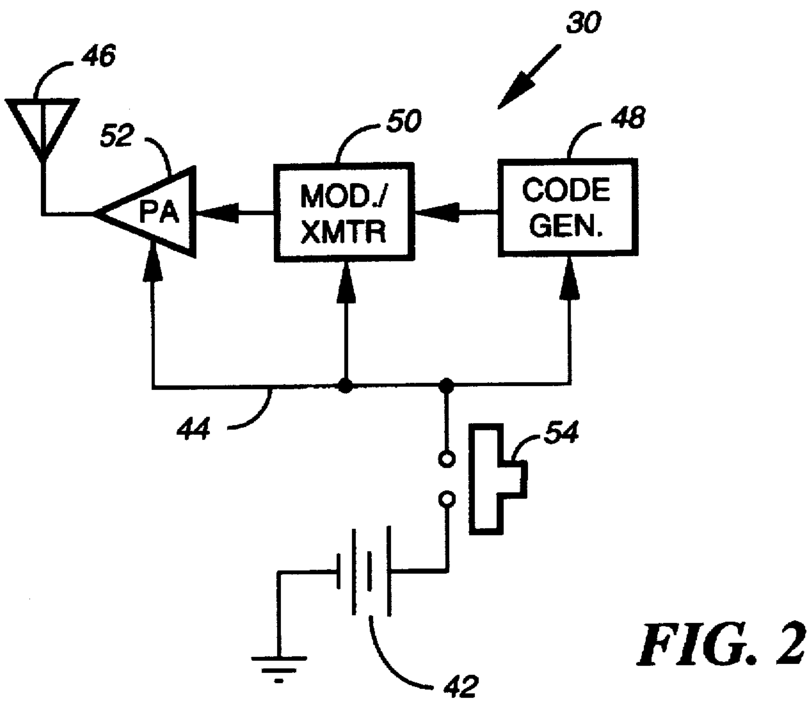
FIG. 2 is a schematic block diagram of a portable alarm unit.

FIG. 2 is a diagram of a portable alarm unit 30. The unit 30 preferably is powered by a replaceable or a rechargeable battery 42 that applies an operating voltage to stages of the alarm unit 30 via a battery bus 44. The battery 42 and other components of the unit 30 preferably are housed in a relatively small package which can be worn or carried conveniently by the person 28. An antenna element 46 is contained in or extends a minimal distance from the unit housing.

In the illustrated embodiment, each alarm unit 30 can produce an emergency, or alert, signal in the form of a coded digital signal. Each unit 30 is identified by a unique digital code comprised of a predetermined number of bits. When a unit 30 is assigned to a person, the unit's digital code and the person's identity are indexed with one another and stored in memory at the security station 12. A corresponding image of the person's face can also be stored in digital form at the security station 12, together with any other vital medical or personal information that could be important in emergency situations, for example, blood type, allergies, and special medical conditions.

A code generator 48 in each alarm unit 30 is set to produce the unit's unique code as a repeating sequence of corresponding code bits. An output of the code generator 48 is applied to an input of a modulator/transmitter 50. The modulator 50 operates to modulate the repeating code bit sequence from the generator 48 on a RF signal, and to produce an encoded RF signal at an output. The output of the modulator 50 is applied to an input of a RF power amplifier 52. Any conventional digital modulation scheme can be incorporated in the modulator 50 including, for example, on-off keying of the carrier signal to minimize battery power consumption. An amplified RF carrier signal is supplied from an output of the amplifier 52 to the antenna element 46 of the alarm unit 30. Battery power is applied to each of the stages 48, 50 and 52 when a person manually actuates a switch 54 that is connected in series between the alarm unit battery 42 and the battery bus 44.

Because the switch 54 can be actuated at any random time, the emergency signal radiated from the antenna element 46 can not be synchronized with any processor-controlled receivers at the relay or security stations of the system 10. Thus, the emergency signal should also include periodic synchronization (sync) pulses at a defined position relative to the bit sequence encoded on the signal. Receiving equipment at the relay and security stations will then be able to decode the emergency signal accurately and reliably to ensure a positive identification of the signaling person 28.

Figure 3:
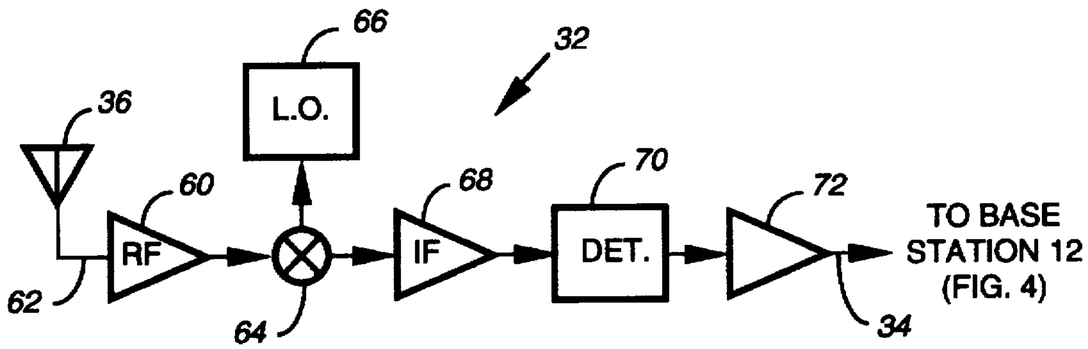
FIG. 3 is a schematic block diagram of a system relay station.

FIG. 3 is a diagram of a typical relay station 32. The station antenna 36 is coupled to an input of a RF amplifier 60 through a shielded transmission line 62. An output of the RF amplifier 60 is applied to one input of a mixer 64, and another input of mixer 64 is coupled with an output of a local oscillator (LO) 66. An output of the mixer 64 is applied to an input of an intermediate frequency (IF) amplifier 68, the output of which is coupled to a detector 70. The detector 70 is configured to decode digital information encoded on the output from the IF amplifier 68, and to provide a corresponding decoded signal to an input of a buffer 72. If, for example, the modulation scheme incorporated in the modulator 50 of the alarm unit 30 is simple on-off keying (i.e., amplitude modulation), the detector 70 preferably is a conventional envelope detector that produces a signal corresponding only to variations in amplitude of the signal output from the IF amplifier 68.

Figure 4:
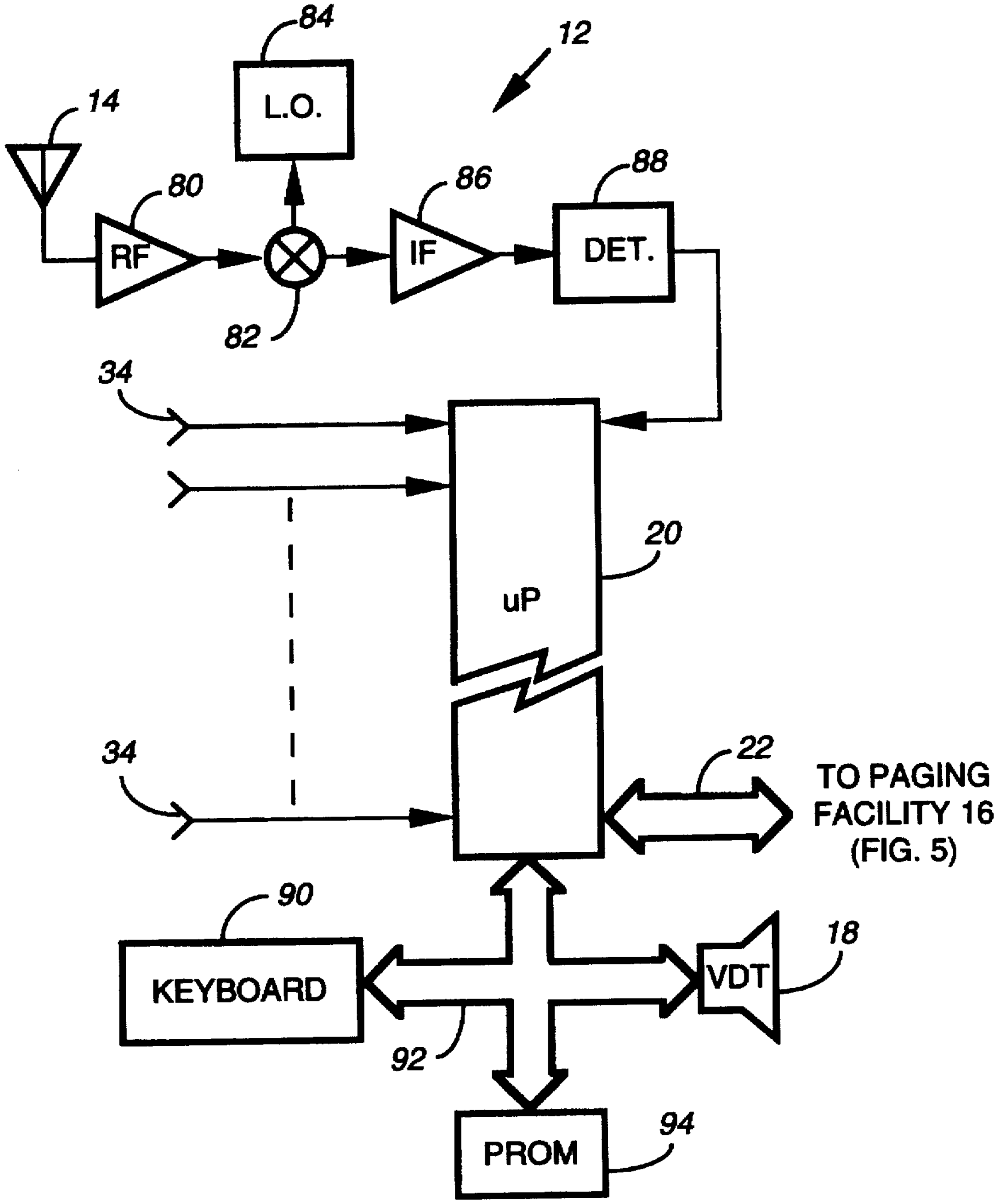
FIG. 4 is a schematic block diagram of a system security station.

An output of the buffer 72 is coupled to the land wire line 34 associated with the relay station 32. The line 34 connects with the security station 12 as is shown in FIG. 4. To avoid noise or other undesired signals from being relayed to the security station 12, conventional threshold circuits can be provided in or between the stages of the relay station 32, so that the signal output on line 34 is quiet in the absence of an emergency signal having a defined minimum field strength at the station antenna 36.

FIG. 4 is a diagram of the security station 12. The security station antenna 14 is coupled through a transmission line to an input of a RF amplifier 80. An output of the amplifier 80 is applied to one input of a mixer 82. Another input of the mixer 82 is coupled with an output from a local oscillator (LO) 84. An output of the mixer 82 is coupled to an input of an IF amplifier 86, an output of which is applied to a detector 88. The stages 80 to 88 of the security station 12 preferably are similar or identical to corresponding stages of the relay station 32. An output of the detector 88 is applied to one input of processor 20. The wire lines 34 from each of the relay stations 32 are also connected to corresponding inputs of the processor 20.

The VDT 18 and a security station keyboard 90 are coupled through a bus 92 with the processor 20, and a PROM 94 is also coupled to the processor 20 through bus 92. The identity (e.g., name) of each person to be protected by the system 10 can be entered via the keyboard 90 into the security station PROM 94, along with the unique digital code assigned to the alarm unit 30 carried by the person. The person's image can also be entered in processor memory through other input means (not shown), and the person's name, image and other stored information relating to the person can be displayed on the VDT 18 as desired. Information relating to a person's location and identity when sending an emergency signal, is made available over the line 22 coupled between the security station processor 20 and the paging facility 16. Information relating to the identities of the officers assigned to protect the area 26, can also be entered into the PROM 94 or other memory means via the keyboard 90.

The location data for the person 28 and the assigned officers can be quantified, for example, by superimposing a defined location grid over the protected area 26, and processing the person's and the officers' locations in terms of two-dimensional grid coordinates. The locations of police/security officers relative to the location of a person sending an emergency signal, can then be determined. Such determinations of relative position are made by the system 10 as explained below.

Figure 5:
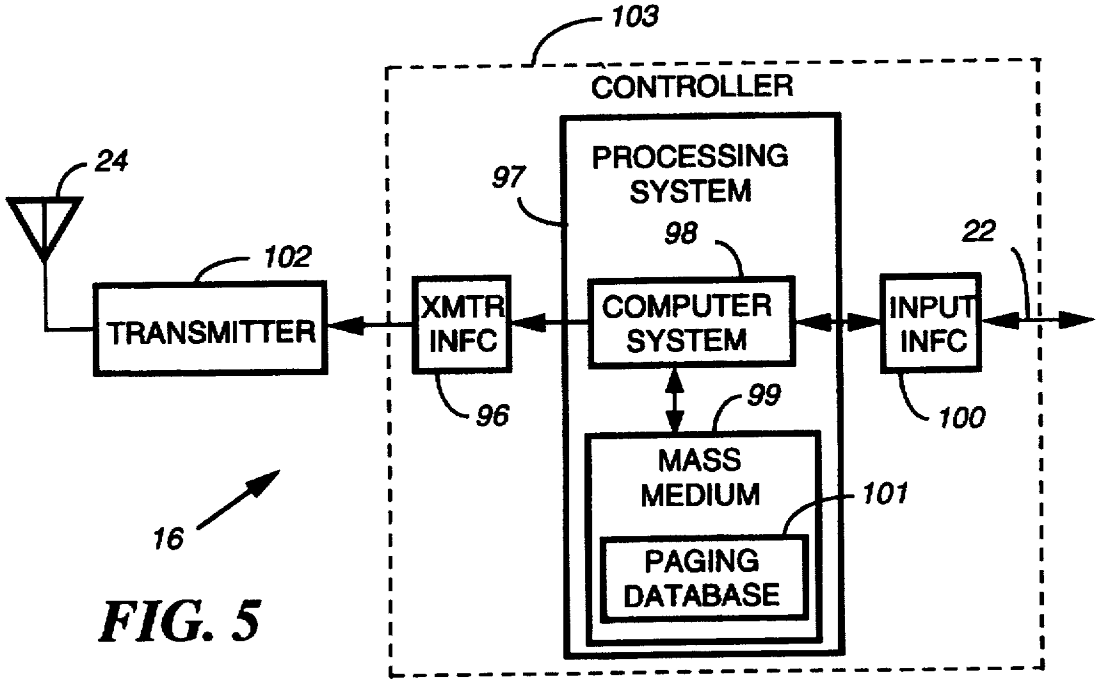
FIG. 5 is a block diagram of a system paging facility.

FIG. 5 is a diagram of the paging facility 16. A controller 103 comprises a processing system 97 for directing operation of the controller 103. The processing system 97 preferably is coupled through a transmitter interface 96 to a conventional transmitter 102.

The processing system 97 is also coupled to an input interface 100 for communicating with the security station 12 through the land wire line 22 for receiving selective call originations therefrom. In order to perform the functions necessary in controlling the elements of the controller 103, as well as the elements of the transmitter 102, the processing system 97 preferably includes a conventional computer system 98, and conventional mass medium 99. The mass medium 99 preferably comprises locations for storing a paging database 101 containing information relevant to the system 10 in accordance with the present invention. The paging database 101 includes subscriber user information such as, for example, addressing, programming options, etc., for the pager units 40.

The conventional computer system 98 is programmed by way of software included in the conventional mass medium 99. The conventional computer system 98 preferably comprises a plurality of processors such as VME Sparc processors manufactured by Sun Microsystems, Inc. These processors include memory such as dynamic random access memory (DRAM), which serves as a temporary memory storage device for scratch pad processing such as, for example, protocol processing of messages destined for the pager units 40. The mass medium 99 is preferably a conventional hard disk mass storage device.

It will be appreciated that other types of conventional computer systems 98 can be utilized, and that additional computer systems 98 and mass medium 99 of the same or alternative type can be added as required to handle the processing requirements of the processing system 97.

Figure 6:
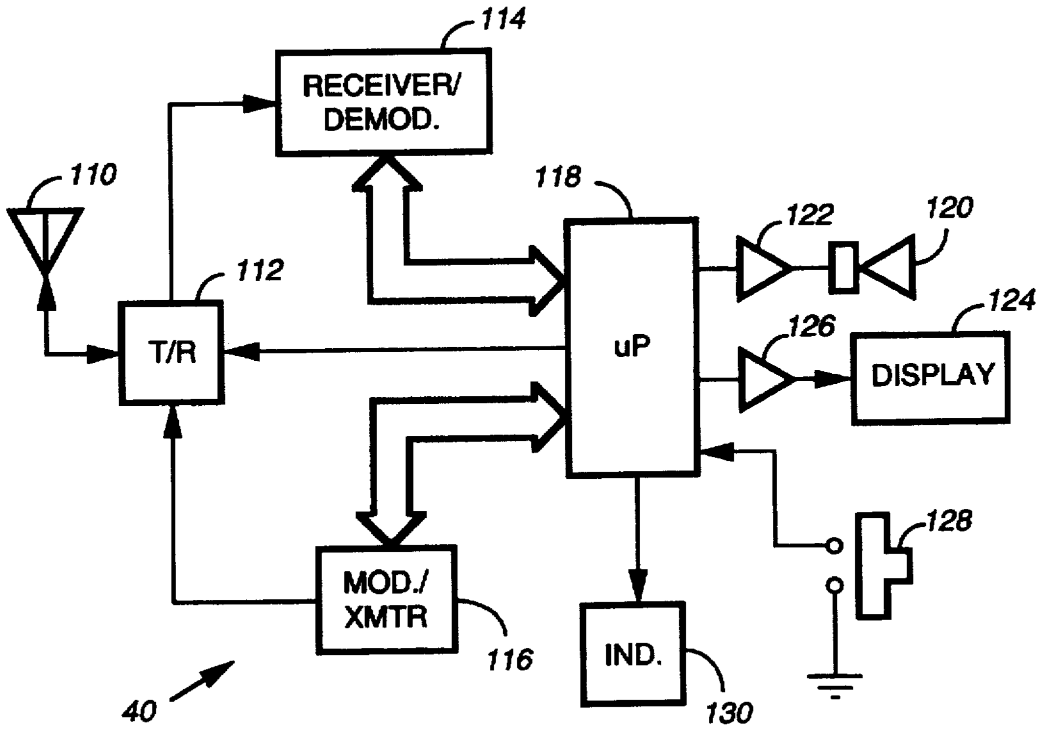
FIG. 6 is a schematic block diagram of a pager unit.

FIG. 6 is a diagram of a portable pager unit 40 that is carried by a police or security officer (or by a team of officers) in the present system 10. An antenna element 110 is coupled to an antenna port of an electronically controlled transmit-receive (T/R) switch 112. A receive port of the switch 112 is coupled to an input of receiver/demodulator 114, and a transmit port of the switch 112 is coupled with an output of modulator/transmitter 116. The pager unit 40 also has a processor 118, which, for example, can be in the form of a digital signal processor (DSP), or a combination of a conventional microprocessor and an application specific integrated circuit (ASIC). The receiver/demodulator 114 is under the control of the processor 118 and, in addition, can incorporate a crystal or a frequency synthesizer as is known in the art. Likewise, the modulator 116 is coupled with the processor 118, and a transmit carrier frequency of the modulator/transmitter 116 can be derived from a frequency synthesizer in a known manner. Preferably, the modulator/transmitter 116 is similar to the modulator/transmitter 50 of the portable alarm unit 30, and operates on the same frequency, so that the relay stations 32 can cooperate with the security station 12 for locating a responding police or security officer.

The operating frequencies and modulation protocol incorporated in the receiver/demodulator 114 correspond to those incorporated in the paging transmitter 102 at the paging facility 16 in FIG. 5. That is, each of the pager units 40 carried by police or security officers in the system 10 is capable of establishing a two-way communications link with the security station 12 whenever a given pager unit 40 is "paged" by the facility, as explained below.

Each pager unit 40 also includes a speaker 120 coupled with an output of the processor 118 through a buffer/amplifier 122, and a display 124 that is coupled with another output of the processor 118 through a display buffer 126. A manual acknowledgment button switch 128 is connected to an input terminal of processor 118. The pager unit 40 can also have an indicator 130. The operation of the T/R switch 112 and activation of the indicator 130, are controlled through corresponding outputs of the processor 118. Components of the pager unit 40 preferably are similar to corresponding components disclosed in the mentioned U.S. Pat. No. 4,940,963.

The present system 10 enables a person 28 when in the protected area 26 to summon help using a portable alarm unit 30 that transmits an emergency signal when activated such as by manual activation by the person 28. The signal is received by a number of the stations 12, 32 so that the person's location can be determined using, for example, known triangulation or trilateration techniques. See, e.g., U.S. Pat. Nos. 5,365,217 (Nov. 15, 1994) and 5,218,344 (Jun. 8, 1993). All relevant portions of the '217 and the '344 patents are incorporated by reference herein.

A group of police or security officers assigned to protect the area 26 can be located by transmitting a group location inquiry signal for reception by the officers' pager units 40. Locations of all the officers relative to the protected area 26 are determined according to location signals emitted from the pager units 40 in a sequence of repeated signals, spaced apart at pseudorandom intervals to avoid collisions, in response to the group page signal. A first officer near the emergency location is selected, and an assistance order signal is transmitted to a pager unit 40 carried by the selected officer. The assistance order signal identifies at least the location of the distress site. The officer is allowed a certain predetermined time period in which to actuate his or her pager unit 40 manually via the button switch 128, thereby positively confirming receipt of the information conveyed by the order signal. The entire event can then be logged by the system 10.

If no acknowledgment signal is received within a preset time, the system can re-transmit the assistance order signal to the first officer, and can also page a next closest officer, awaiting an acknowledgment signal as before. Transmission of the assistance order signal repeats until an acknowledgment signal is received, confirming the response of certain officers to a particular distress call.

Figure 7:
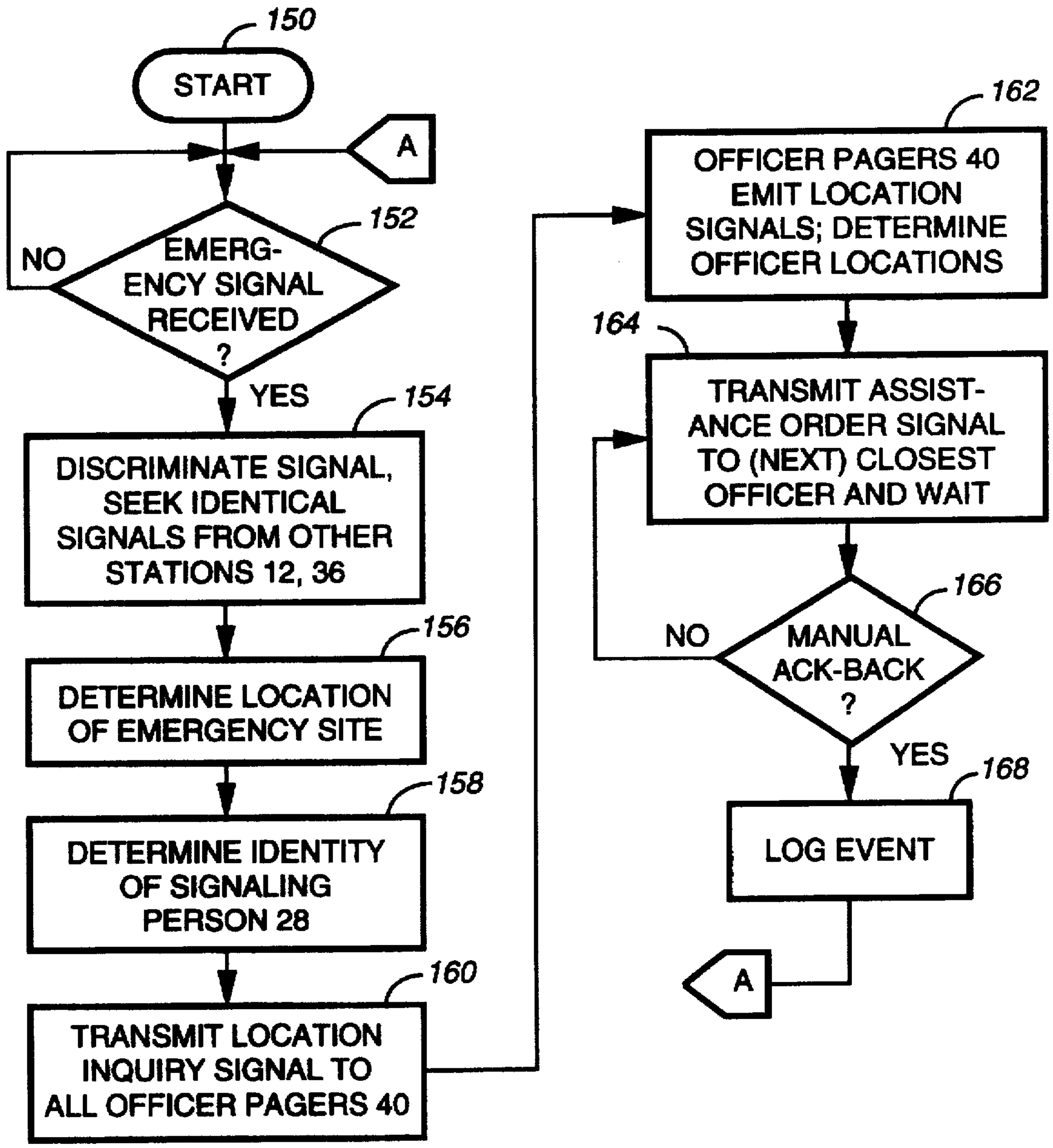
FIG. 7 is a flow chart of operations carried out by the present security system.

FIG. 7 is a flow chart of operations carried out by the system 10, once an emergency signal is received at one or more of the stations 12, 32. The process starts at step 150, and the system 10 monitors in step 152 for an emergency signal from a person 28 within the protected area 26. If an emergency signal is detected and supplied to the security station processor 20 from one of the relay station or security station detectors 70, 88, the system 10 advances from the monitoring step 152 and the processor 20 discriminates the first detected emergency signal at step 154. For example, processor 20 decodes the detected signal and then seeks other signals at its inputs which when decoded are identical with the first detected signal. Because each of the detected signal input lines corresponds to a certain one of the relay stations 32 or to the security station 12, the station location at which each detected input signal was received is known.

Once a sufficient number (e.g., three) of detected signals are identified by the processor 20 as originating from a single alarm unit 30 (step 154), the processor 20 enters a location determination routine in step 156. The location of the alarm unit 30 within the area 26 can, for example, be determined according to the time of arrival (TOA) of the signal at each of three or more receiving stations 12, 32, in accordance with known signal processing techniques. See, for example, D. J. Torrieri, Statistical Theory of Passive Location Systems, IEEE Transactions on Aerospace and Electronic Systems, March 1984, at pages 183, et seq. The cited article is incorporated by reference herein.

When using TOA processing techniques for a location determination, compensation for propagation time delays for the detected emergency signals to travel over the wire lines 34 from the relay stations 32, must of course be made. In step 158, the security station processor 20 determines the identity of the person 28 sending the emergency signal with his or her alarm unit 30, by comparing the bit sequence decoded from the detected emergency signal with a stored table of bit sequences assigned to authorized alarm unit carriers. The person's name is then retrieved together with any other vital information in the person's file. It will be appreciated that, alternatively, a signal strength measurement can be used to determine the location of the alarm unit 30 when TOA techniques are not feasible, e.g., when a single relay station has received the signal.

Next, in step 160, the security station processor 20 signals the paging transmitter 102 at the facility 16, to transmit a group location inquiry or page signal for reception by all the portable pager units 40 carried by police/security officers assigned to the protected area 26. The processors 118 of the pager units are programmed to respond to the group page signal without manual intervention, by emitting location signals during corresponding time intervals after transmission of the group page signal from the paging facility 16. Step 162. The processor 20 at the security station 12 then operates to determine the location of each of the responding pager units 40, for example, by using a TOA location determination routine the same or similar to the one used to locate the person 28 in step 156. The identity of a security officer (i.e., a specific pager unit 40) that is closest to the signaling person 28, is determined by the processor 20 in step 164. The security station then signals the paging transmitter 102 to transmit an assistance order signal to the pager unit of the identified officer. The assistance order signal contains information identifying the location of the signaling person 28, along with other pertinent information retrieved by the processor 20 in step 158, e.g., the person's name and other vital personal information. If the pager unit display 124 has image capability, an image of the person can also be conveyed over the line 22 and transmitted to the selected officer from the paging transmitter 102.

The system 10 then waits a predetermined time for a manual acknowledgment from the paged officer, such acknowledgment being decoded by the relay stations 32 in cooperation with the security station 12. That is, the paged officer must operate the button switch 128 manually on his or her pager unit 40, and the acknowledgment is logged by the system 10 to confirm that the officer actually set out to assist the person 28 who called for help. The indicator 130 on the pager units 40 can serve to remind selected officers of the need for the manual acknowledgment. If a selected officer does not acknowledge within a preset time, the system 10 can re-send the assistance order signal to the officer; or, alternatively, the system can transmit the order signal to an officer who is located next closest the person 28, and await a manual acknowledgment from the second paged officer. Once an acknowledgment signal is decoded, the identity of the acknowledging officer is determined and the system logs the event in step 168. The security station processor 20 then returns to step 152 and continues to monitor for emergency signals.

While the foregoing description represents a preferred embodiment of the invention, it will be obvious to those skilled in the art that various changes and modifications can be made. For example, the alarm unit 30 can be capable of transmitting information relating to the nature of a problem encountered by the person 28 which, when decoded by the security station processor 20, can be conveyed via the paging facility 16 to an officer selected to assist the person. Accordingly, the scope of the invention is delimited only in accordance with the following claims.

What is claimed is:

1. A method by which a person who encounters an unforeseen event within a predetermined area requests the presence of at least one member of a group of mobile members prepositioned within or near the predetermined area, the person having a portable transmitter capable of being actuated by the person, each member having a portable pager transceiver, comprising:

the portable transmitter transmitting an alert signal upon actuation;

determining a location of the unforeseen event by receiving the alert signal;

transmitting a group location inquiry signal;

determining locations of the members according to location signals emitted from each portable pager transceiver in response to the group location inquiry signal; and transmitting to a first portable pager transceiver associated with a member located closest to the unforeseen event a signal identifying the location of the unforeseen event.

2. The method of claim 1, including waiting a predetermined period for reception of an acknowledgment signal from the first portable pager transceiver wherein the acknowledgment signal is produced by a first member of the group of mobile members by manually actuating an associated first portable pager transceiver thereby acknowledging receipt of the location of the unforeseen event.

3. The method of claim 2, including transmitting an order signal identifying the location of the unforeseen event to a second portable pager transceiver associated with a member located next closest to the unforeseen event after elapse of the predetermined period without reception of an acknowledgment signal from the first portable pager transceiver.

4. A method of summoning police or security personnel to assist a person in an emergency situation, comprising:

placing members of a group of police or security personnel in a region of a protected area in which a member of the group may be needed to assist a person who encounters an emergency situation in the protected area;

providing members of the group with portable pager transceivers;

providing a person entering the protected area with a portable alarm unit which transmits an emergency signal from the portable alarm unit when actuated by the person when encountering the emergency situation;

receiving the emergency signal at least one security station, and determining an emergency location relative to the protected area from which the emergency signal originated;

locating members of the group by transmitting a group location inquiry signal for reception by the portable pager transceivers of the group, and determining locations of the members of the group relative to the protected area according to location signals emitted from the portable pager transceivers in response to the group location inquiry signal; and selecting at least a first member of the group near the emergency location, and transmitting an assistance order signal identifying the emergency location to a portable pager transceiver associated with the selected first member of the group.

5. The method of claim 4, including waiting a certain time period for reception of an acknowledgment signal from the portable pager transceiver wherein the acknowledgment signal is produced by the selected first member of the group by manually actuating the associated portable pager transceiver thereby acknowledging receipt of an identified emergency location.

6. The method of claim 5, including conveying personal information on the emergency signal from the portable alarm unit serving at least to identify the person.

7. The method of claim 5, including selecting a plurality of the members of the group in the region of the emergency location, and transmitting an assistance order signal identifying the emergency location to pager transceivers associated with the selected members of the group, and wherein the waiting step comprises waiting a certain time period for reception of at least one acknowledgment signal from a pager transceiver associated with at least one of the selected plurality of members of the group.

8. The method of claim 5, including emitting location signals from the portable pager transceivers in an absence of manual activation by members of the group.

9. The method of claim 5, including:

re-transmitting the assistance order signal if no acknowledgment signal is received within the certain time period; and returning to the waiting step.

10. The method of claim 5, including selecting a second member of the group near the emergency location, and, if no acknowledgment signal is received after waiting the certain time period, transmitting the assistance order signal to a second pager transceiver associated with the selected second member of the group.

11. The method of claim 10, wherein the selected first member of the group is a member located closest to the emergency location, and the selected second member of the group is a member next closest to the emergency location.

12. The method of claim 4, wherein the selected first member of the group is a member located closest to the emergency location.

13. The method of claim 4, including determining locations of the members of the group, by using processor means located at a security station.

14. The method of claim 4, including selecting at least a first member of the group near the emergency location, and transmitting an assistance order signal identifying the emergency location to a pager transceiver associated with the selected first member of the group, by using processor means located at a security station.

15. The method of claim 4, including conveying personal information on the assistance order signal transmitted to a pager transceiver, serving to identify a person in need of assistance at the emergency location.

16. A system for summoning police or security personnel to assist a person in an emergency situation, comprising:

a plurality of portable pager transceivers each of which is associated with a member of a group of police or security personnel in a region of a protected area;

a portable alarm unit which transmits an emergency signal when actuated by a person to whom the portable alarm unit is provided;

at least one security station having a base receiver responsive to an emergency signal transmitted from the portable alarm unit;

a processor for determining an emergency location from which the emergency signal originated; and a transmitter for transmitting a group location inquiry signal for reception by pager transceivers of the group, wherein location signals are emitted from the portable pager transceivers in response to the group location inquiry signal, wherein the base receiver is responsive to the location signals and is operative to determine locations of members of the group, and wherein the processor is operative to:

(a) select a first member of the group near the emergency location, and (b) control a transmission of an assistance order signal identifying the emergency location to a portable pager transceiver associated with the selected first member of the group.

17. The system of claim 16, wherein the processor is also operative to: (c) wait a certain time period for reception of an acknowledgment signal from the portable pager transceiver, wherein the pager transceiver produces the acknowledgment signal when the selected first member of the group manually actuates the portable pager transceiver to acknowledge receipt of the identified emergency location.

18. The system of claim 17, wherein the processor is further operative to:

(d) re-transmit the assistance order signal if no acknowledgment signal is received within the certain time period; and (e) return to the wait operation (c).

19. The system of claim 17, wherein the processor includes means for selecting a second member of the group near the emergency location, and, if no acknowledgment signal is received after waiting the certain time period, for controlling transmission of the assistance order signal to a second pager transceiver associated with the selected second member of the group.

20. The system of claim 19, wherein the processor includes means for selecting the first member of the group to be a member located closest to the emergency location, and for selecting the second member of the group to be a member next closest to the emergency location.

21. The system of claim 16, wherein the portable alarm unit includes means for conveying personal information on the emergency signal serving at least to identify the person.

22. The system of claim 16, wherein the processor includes means for selecting as the selected first member of the group near the emergency location a member located nearest to the emergency location.

23. The system of claim 16, wherein the processor includes means for selecting a plurality of the members of the group in the region of the emergency location and controlling transmission of an assistance order signal identifying the emergency location to pager transceivers associated with the selected plurality of the members of the group.

24. The system of claim 23, wherein the processor includes means for waiting a certain time period for reception of at least one acknowledgment signal from a pager transceiver associated with at least one of the selected plurality of members of the group.

25. The system of claim 16, wherein the plurality of portable pager transceivers include means for emitting location signals in an absence of manual activation.

26. The system of claim 16, wherein the processor includes means for conveying personal information on the assistance order signal transmitted to a pager transceiver, for identifying a person in need of assistance at the emergency location.

27. A system, comprising:

a portable transmitter for transmitting an alert signal;

at least one base receiver responsive to the alert signal;

a processor coupled to the at least one base receiver for determining a location from which the alert signal originated;

a transmitter coupled to the processor for transmitting a group location inquiry signal; and a plurality of portable pager transceivers for receiving the group location inquiry signal and for transmitting location signals in response to the group location inquiry signal, wherein the processor is operative to:

(a) select at least one portable pager transceiver near the location, and (b) control a transmission of an order signal identifying the location from which the alert signal originated.

* * * * *